United States Patent
Hogben et al.

[15] 3,656,730
[45] Apr. 18, 1972

[54] MOULD FOR PRODUCING SHAPED ARTICLES FROM FOAM FORMING COMPOSITIONS

[72] Inventors: Peter Reginald Hogben; Eric Short, both of Marley Foam Ltd. Dickley Lane, Lenham, Kent, England

[22] Filed: Apr. 23, 1969

[21] Appl. No.: 818,650

[30] Foreign Application Priority Data

May 1, 1968 Great Britain......................20,675/68

[52] U.S. Cl..............................249/134, 249/117, 249/141
[51] Int. Cl..........................................................B28b 7/34
[58] Field of Search................249/117, 114, 115, 141, 134, 249/204, 142, 144; 18/36, 39; 25/121 R

[56] References Cited

UNITED STATES PATENTS

| | | | |
|---|---|---|---|
| 2,611,926 | 9/1952 | Grannis | 18/39 |
| 2,615,202 | 10/1952 | Talalay | 249/142 X |
| 2,779,080 | 1/1957 | Chidester | 25/121 R X |
| 2,872,906 | 2/1959 | Jordan | 18/39 |
| 2,949,657 | 8/1960 | Anson | 25/121 R X |
| 3,010,157 | 11/1961 | Cizek | 249/134 UX |
| 3,066,351 | 12/1962 | Schriner | 18/DIG. 44 |
| 3,133,978 | 5/1964 | Bartley et al. | 18/DIG. 44 |
| 3,163,687 | 12/1964 | Einhorn | 18/39 X |
| 3,248,758 | 5/1966 | Schmitz et al. | 249/134 X |
| 3,421,551 | 1/1969 | Currier | 249/134 UX |
| 3,503,583 | 3/1970 | Jester et al. | 249/134 X |
| 2,734,227 | 2/1956 | Costuk et al. | 18/39 |

FOREIGN PATENTS OR APPLICATIONS

| | | | |
|---|---|---|---|
| 1,412,313 | 8/1965 | France | 18/39 |
| 672,468 | 5/1952 | Great Britain | 18/39 |
| 465,927 | 10/1951 | Italy | 18/39 |

*Primary Examiner*—J. Howard Flint, Jr.
*Attorney*—Chittick, Pfund, Birch, Samuels & Gauthier

[57] ABSTRACT

A mould for use in the production of moulded articles from foam-forming compositions. The mould has a shaped mould portion into which a foam-forming composition is introduced and a closure member for closing the mould during foaming. The rim of the shaped mould portion has a lip which extends inwardly beyond the inner surface of the shaped mould portion and which is close to the closure member when the mould is closed. The lip serves to direct the gases escaping from the mould during foaming thereby substantially reducing the formation of a hard edge around the periphery of the moulded article.

9 Claims, 2 Drawing Figures

PATENTED APR 18 1972　　　　　　　　　　　　3,656,730

INVENTORS
Peter R. Hogben
Eric Short
BY
Chittick, Pfund, Birch, Samuels
& Gauthier

MOULD FOR PRODUCING SHAPED ARTICLES FROM FOAM FORMING COMPOSITIONS

This invention is concerned with moulded articles which are produced by the expansion of foam-forming compositions in moulds.

Polyurethane foam cushions are generally produced by applying a polyurethane foam-forming composition on to the surface within a shaped mould, closing the mould with a lid and allowing the foam-forming composition to expand to fill the mould. The foam-forming composition expands upwards to the inner surface of the lid, and the air originally present in the mould is compressed to above atmospheric pressure and escapes by leakage between the rim of the mould and the lid. In practice a small amount of foam also escapes between the rim of the mould and the lid and this results in a thin strip of foam being produced around the periphery of the cushion; this phenomenon is commonly known as "feathering." The feathering is generally removed, but this in itself does not usually create a problem in that the strip of foam is sufficiently thin to be brushed or rubbed off by hand. The feathering does however represent a wastage in material, and as the mould wears with use and the lid consequently becomes a less good fit this wastage can become of significance and moreover the feathering may become more difficult to remove.

When feathering occurs, the foam of the cushion adjacent the feathering is of higher density than the foam in the remainder of the cushion. This higher density foam is that formed adjacent the gap between the rim of the bowl-shaped mould and the lid and the higher density results from the fact that this foam is formed at higher pressure produced as the foam-forming compositions expand towards the said gap. The higher density foam is harder than the remaining foam, and thus a belt of harder foam is present around the periphery of the cushion; this phenomenon is commonly known as the presence of "hard edge."

The presence of "hard edge" is in some circumstances particularly disadvantageous. For example, polyurethane foam cushions which are bevelled on both top and bottom are produced in two halves. Each half is separately produced in a mould with a bevelled bottom and a flat lid, and thus has one bevelled side with the other side which is formed against the lid substantially flat. The flat surfaces of the two halves are then adhered together with a suitable adhesive to form the cushion bevelled on both sides. In this method "hard edges" are formed around the peripheries of the flat sides of the two cushion halves, and when the flat sides are adhered together the "hard edges" are positioned against one another. If a fabric is stretched over the completed cushion as for example in the use of the cushion for furniture, the hard edges will show through the fabric and this can be unsightly and generally undesirable.

It is one object of the present invention to provide a means of overcoming at least in part the disadvantages associated with the phenomena of "feathering" and "hard edge" which arise in the production of moulded cushions and other articles produced by the expansion of foam-forming compositions in moulds. The invention is based essentially upon the discovery that the disadvantages are at least in part overcome if a lip is provided around the rim of the mould and extending inwards into the mould. When such a lip is provided, any leakage of air and exudation of foam takes place between the lip and the lid of the mould, and thus such feathering as may be produced will not be around the periphery of the moulded article formed but will be inset by a distance equal to the distance for which the lip extends inwards into the mould. Likewise any "hard edge" formed will be inset from the periphery of the article and when for example bevelled cushions are produced in two halves as described above the hard edges are sandwiched inside the final cushion and do not give rise to unsightly ridges when the cushion is covered with stretched fabric.

According to the present invention, there is provided a mould for use in the production of moulded cushions or other moulded articles from foam-forming compositions which comprises a shaped mould portion into which a foam-forming composition may be introduced and a closure member for closing the mould during foaming of the foam-forming composition, the rim of the shaped mould portion on to which the closure member fits when the mould is closed being provided with a lip which extends inwardly and which is close to the closure member when in the closed position thereby serving in use to direct gases escaping from the mould during foaming whereby the formation of hard edge around the periphery of the moulded article produced is reduced or prevented.

While the lip may if desired be made of the same material as the mould (e.g. a metal such as for example aluminum or fiber glass bonded with an epoxy resin) and may indeed be integral therewith, the lip is preferably provided by a different material having a degree of flexibility.

The invention will now be further described with reference to the accompanying drawings in which.

Figure 1:
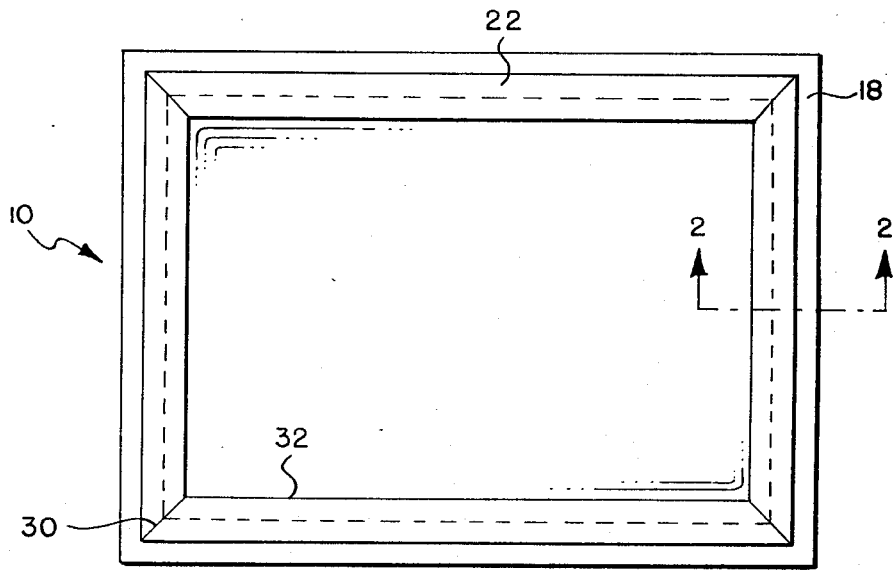
FIG. 1 is a plan view of a mould in accordance with the present invention.
Figure 2:
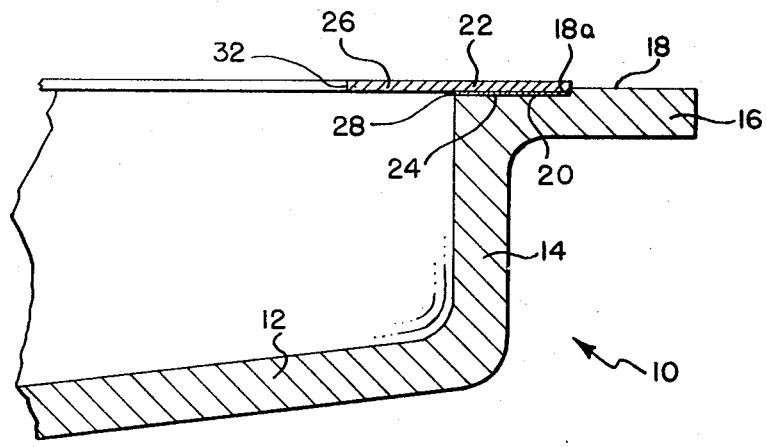
FIG. 2 is a cross-section of part of the same mould taken on the line 2-2 of FIG. 1.

The mould shown in FIGS. 1 and 2 is suitable for use in the production of the two halves of a bevelled cushion.

The mould 10 has a shaped mould portion 12, vertical sides 14 and an outward facing rim 16 with a flat upper surface 18. A recess 20 having a depth of about 0.03 inches and a width of about 0.875 inches is provided around the inner edge 18a of the flat upper surface of the rim. A thin strip 22 of plastic material having a thickness of about 0.04 inches and a width of about 1.375 inches is rebated into the recess by means of a suitable adhesive 24. The strip 22 extends inwards into the mould by a distance of about 0.5 inches to form an inward-facing lip 26. With an epoxy resin-bonded fiber glass mould and a strip 22 of ABS plastic material (a vinyl chloride copolymer with acrylonitrile/butadiene/styrene), the strip can for example conveniently be fixed with an epoxy resin adhesive. It is important that the bond between the strip 22 and the surface of the recess 20 should be air-tight to prevent leakage at the joint 28 with consequent feathering and production of a peripheral hard edge.

Gaps 30 are provided in the lip 26 at each of the corners of the mould. These gaps constitute openings which allow passage of air from beneath the lips and thus reduce the tendency for air to be trapped under the lip.

When a foam-forming composition is introduced into the mould and a flat lid is positioned to close the mould, the foam expands to fill the mould. Any leakage of air occurs between the tip 32 of the lip and the lid, and any feathering and hard edge will thus occur not at the periphery of the cushion but a position inset from the periphery by about 0.5 inches. When the lid is removed, the feathering can be brushed or rubbed off and the moulded half-cushion removed from the mould.

Where the lip 26 is made of a material having a degree of flexibility, it has been found that during foaming the lip is pressed against the lid of the mould to produce a very good seal. This substantially reduces the amount of feathering which occurs, and likewise the "hard edge" phenomenon is exhibited to a lesser extent. The strip 22 is thus preferably made of a metal or plastics material having a degree of flexibility.

Where a plastics material are selected, it should be stable at the temperatures which re encountered during foaming. When the temperature does not rise about about 60°–70° C., polyvinyl chloride may be used. At higher temperatures vinyl chloride copolymers stable at higher temperatures than polyvinyl chloride can be employed, and one such material is the ABS copolymer referred to above. Other useful plastic materials include polyethylene, polytetrafluoroethylene, polyamides (e.g. Nylon) and polyesters.

The strip 22 which in the embodiment illustrated in the drawings is made of plastics material, can if desired be made of metal, advantageously spring steel. Metal strip can conveniently be attached to the rim of the shaped mould portion for example by means of screws, and this has the advantage that the strip can be removed as desired without difficulty. The strip may also if desired be made of gauze strip.

The thickness of the strips 22 is advantageously selected to provide the desired degree of flexibility, and a suitable thickness for plastics materials may for example be from 0.015 to 0.060 inches, preferably from 0.020 to 0.040 inches. With spring steel strip, the preferred thickness of the strip is from 0.005 to 0.020 inches, advantageously about 0.010 inches.

The distance by which the lip 4 extends inwards into the mould is of importance. The distance should in general be sufficient so as effectively to remove any hard edge which may be formed from the periphery of the cushion and it has been found that distances of at least about 0.25 inches are desirable. On the other hand, the distance should not be so great as to cause undue trapping of air under the lip as this could result in undesired imperfections in the foam produced in these regions. A distance of not greater than about 1 inch is preferred, and generally the distance by which the lip 26 extends into the mould is advantageously from 0.5 to 1.0 inches, with plastics materials and from 0.30 to 0.75 inches, advantageously 0.30 to 0.40 inches, with spring steel.

It will be noted from FIG. 2 of the drawings that the lip 26 is proud of the rim 16. While the lip 26 can if desired be flush with the rim 16, it has been found that it is advantageous for the lip 26 to be proud of the rim 16, e.g., by about 0.010 inches. Upon positioning of the lid over the mould, the lower surface of the lid then comes into contact only with the lip 26 and in these circumstances a generally improved seal can be obtained.

There is sometimes a tendency for air to be trapped under the lip and this tendency may be substantially reduced by providing the lip with additional openings in the form of venting holes so positioned that the trapped air may escape without the formation "hard edge." In spring steel, these holes may, for example, be circular and have a diameter of approximately 0.03125 inches. These holes may be situated at intervals along the length of the lip thereby permitting trapped air to be expelled more evenly along the length of the lip. This expulsion of entrapped air or "breathing" is of importance and may, for example, be improved by the use of a lip constructed from fine gauze.

The foam-forming compositions used in the moulds according to the invention can be of any desired type. In the manufacture of cushions a polyurethane foam-forming composition is conveniently used, and this may be a polyurethane polyester or more preferably a polyurethane polyether foam-forming composition. The moulds are useful both with a polyurethane foam-forming composition in which external heating is required to effect foaming and with a so-called "cold curing" polyurethane foam-forming composition when little or no external heating may be required. In addition, the moulds may be used with foam-forming compositions which are based for example on vinyl chloride homopolymers and copolymers and on polyethylene. The phenomenon of "hard edge" only arises in general with articles made from flexible and semi-rigid foams; with articles of rigid foam the whole article is hard and unyielding. The foam-forming compositions are therefore generally compositions selected to provide a flexible or semi-rigid foam upon expansion. Also the "hard edge" phenomenon is of especial significance with low density foams, e.g., foams having a density of from 1 to 5 lb./cu.ft. and especially from 2 to 4 lb./cu.ft.

While the invention has been described in detail above in relation to the production of foam cushions, it will be understood that the invention is generally applicable to overcoming at least in part the disadvantages of the phenomena of "feathering" and "hard edge" which may arise in the production of moulded articles by the expansion of foam-forming compositions in moulds.

We claim:

1. A mould for use in the production of moulded cushions or other moulded articles from foam-forming compositions, said mould comprising a shaped mould portion having an open end into which a foam forming composition may be introduced and having a peripheral rim at the open end thereof adapted to receive a closure member for closing the mould during foaming of the foam-forming composition, the rim of the shaped mould portion being provided with a lip which extends into said mould portion and which is close to the closure member when in the closed position thereby serving in use to direct gases escaping from the mould during foaming whereby the formation of hard edge at the periphery of the moulded article produced is reduced or prevented, said lip being fixedly secured to said rim such that said lip remains secured to the rim when the closure member is removed from said mould portion.

2. A mould as set forth in claim 1 in which the lip extends into said mould portion a distance of from 0.25 to 1 inch.

3. A mould as set forth in claim 1 in which openings are provided in the lip whereby in use gases can escape from under the lip.

4. A mould as set forth in claim 1 in which the lip is provided by a strip of flexible plastic material adhered by an airtight bond to the rim of the shaped mould portion.

5. A mould as set forth in claim 4 wherein the lip has a thickness of from 0.015 to 0.060 inches.

6. A mould as set forth in claim 4 in which the lip extends into the mould portion a distance of from 0.5 to 1 inch.

7. A mould as set forth in claim 1 in which the lip is made of spring steel strip.

8. A mould as set forth in claim 7 wherein the lip has a thickness of from 0.005 to 0.02 inches.

9. A mould as set forth in claim 7 in which the lip extends into the mould portion a distance of from 0.30 to 0.75 inches.

* * * * *